Sept. 25, 1962
R. E. SAUZEDDE
3,055,472
ONE-WAY CLUTCHES
Filed Sept. 30, 1959
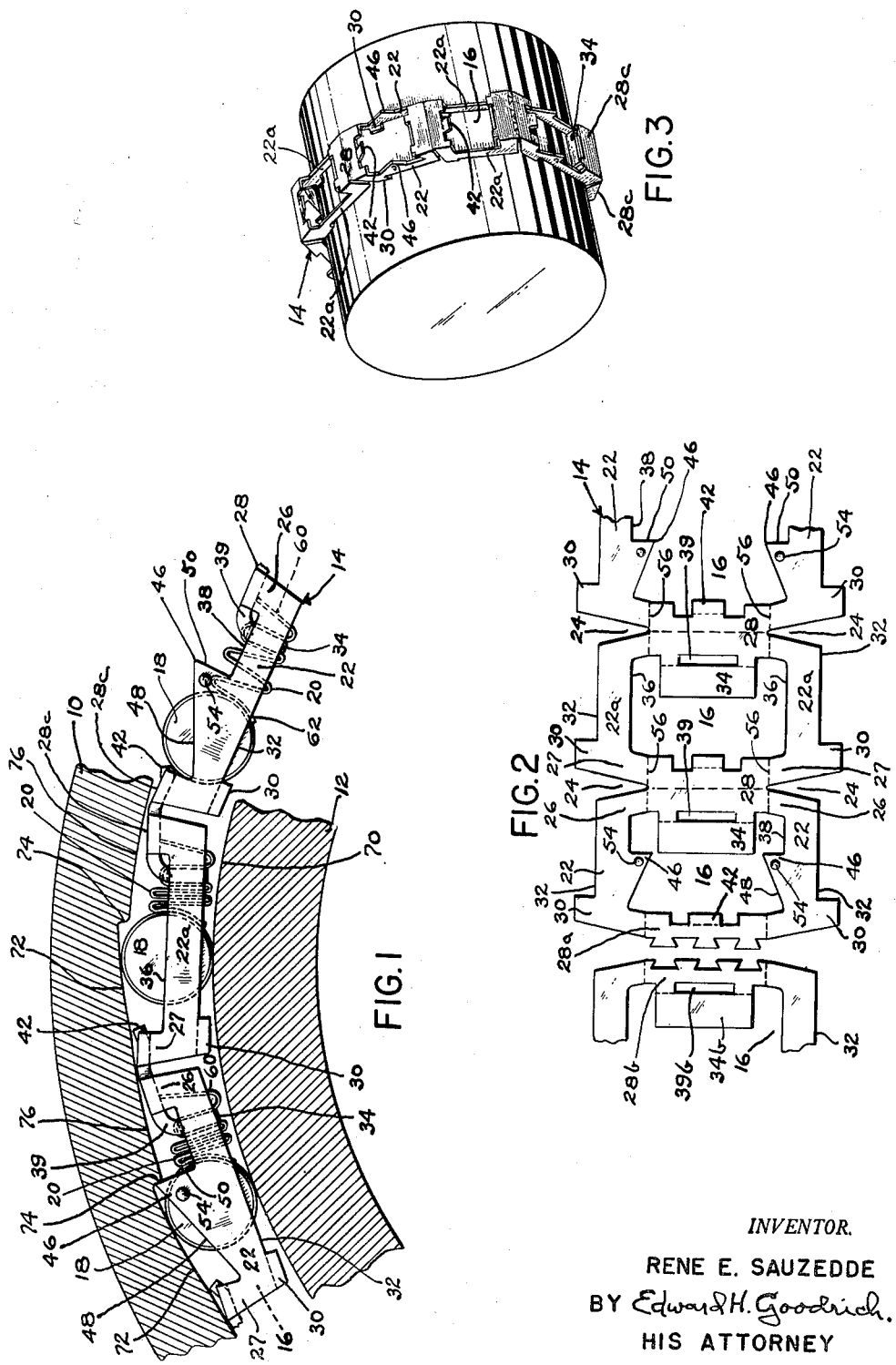
INVENTOR.
RENE E. SAUZEDDE
BY Edward H. Goodrich.
HIS ATTORNEY

United States Patent Office 3,055,472
Patented Sept. 25, 1962

3,055,472
ONE-WAY CLUTCHES
Rene E. Sauzedde, Terryville, Conn., assignor to General Motors Corporation, Detroit, Mich., a corporation of Delaware
Filed Sept. 30, 1959, Ser. No. 843,447
10 Claims. (Cl. 192—45)

This invention relates to one-way clutches and particularly to a unit-handling rolling element type clutch having an improved cage construction.

Prior one-way, rolling-element type clutches wherein rollers are shifted into and out of wedged driving engagement between race rings, have left much opportunity for improvements. Due to the inherent limitations in these prior constructions, the cages which guide the rollers objectionably restrict the number of rollers with the result that the torque capacity of the clutch is often insufficient to meet the load requirements within the space available. Also, in these prior constructions, slippage occurs between the rollers and the race rings with the result that often the entire driving load is suddenly imposed upon one or upon a very few rollers thereby damaging the rollers and race rings. Additionally, these prior roller clutches frequently develop conditions of chatter which contribute to very short clutch life as well as to improper clutch operation. It has been common practice to hand assemble the many clutch parts in final position which is expensive, time-consuming, and often difficult, since many driving mechanisms require blind assemblies. Furthermore, many roller clutches have complicated multipart cage assemblies which are rivetted or bolted together thereby adding to the cost of manufacture and assembly as well as providing weakened portions in the cage which contribute to shortened clutch life causing rapid failure in a driving mechanism.

It is, therefore, an object of my invention to provide an improved, one-way clutch of the rolling-element type which is light in weight, rugged in construction, effective in operation, simple to manufacture and assemble with relatively few parts, and wherein the rolling elements will independently shift into and out of driving positions.

Another object of this invention is to provide an improved rolling-element type clutch of unit-handling construction and wherein the roller guiding cage is of light weight and fabricated from a single member.

Another object of my invention is to provide an improved, one-way roller clutch wherein the cage which guides the rollers is bent to form from a single piece of stamped-out sheet material.

Another object of this invention is to provide an improved method of making a roller guiding cage for a one-way clutch.

A further object of my invention is to provide an improved one-way roller clutch having a unitary metal cage bent up from a cut-out sheet of metal which locates the rollers in unit-handling relation therewith and in required circumferentially spaced relation.

To these ends and also to improve generally upon devices and methods of this character, this invention consists in the various matters hereinafter described and claimed. In its broader aspects, this invention is not necessarily restricted to the specific structures and methods illustrated in the accompanying drawings wherein:

FIGURE 1 is a fragmentary cross sectional end view of my improved one-way clutch;

FIGURE 2 is a fragmentary view showing my stamped-out cage blank before it is bent up to form; and FIGURE 3 is a perspective view showing my sheet metal cage bent to annular form about a mandrel.

My improved unit-handling one-way clutch is particularly adaptable for torque converters as commonly used in automotive drives and also for other applications where there is need for a rugged, one-way driving connection that is free from backlash. Generally considered, this clutch includes an outer race ring 10 radially spaced from and in coaxial relation with an inner race ring 12 through a suitable means such as an outboard bearing. In the space between these race rings, there is provided an annular cage generally indicated at 14 and which in the present instance is stamped out and bent up to form from suitable material such as sheet metal. This cage is provided with circumferentially spaced windows 16 in which are respectively secured rollers 18 that are spring-urged into one-way driving engagement between cam portions on one of the race rings and a circular raceway on the other race ring. Springs 20 secured to the cage 14 and respectively projecting into each of the windows 16 serve the dual purpose of holding the rollers in unit-handling relation with the cage during assembly and disassembly of the clutch and urging each of the rollers individually into non-backlash driving engagement with the race rings.

As illustrated in FIGURE 2, suitably rugged but deformable strip material, as sheet metal, is stamped out to provide cooperating sets of interconnected side walls 22 and 22a located at the opposite sides of each window 16. The adjacent side walls 22 and 22a at each side of the cage are interrupted between adjacent windows by laterally and inwardly extending V-shaped recesses or cutouts 24 which provide angularly and inwardly converging arms 26 and 27 that are interconnected to common cross bars 28 between the ends of adjacent windows. The arms 27 at the forward end of each of the windows 16 terminate in laterally outwardly projecting lugs 30 which also project beyond parallel end faces 32 of the side walls 22 and 22a. A tongue 34 projects laterally from each cross bar 28 and into the rearward ends of each window 16, this tongue being in laterally spaced relation to side faces 36 in some of the windows and in laterally spaced relation to side faces 38 in the other windows. The junction of each tongue 34 with its cross bar 28 is interrupted by a blind-ended through slot 39 for receiving the spring 20 as will be later described. The side of the cross bar 28 at the forward end of each window 16 is interrupted by a pair of laterally spaced recesses which provide an intermediate projecting lug 42. The side walls 22, which are in alternating relation with the side walls 22a, are each provided with an inwardly projecting tooth portion 46 having a sloping wall 48 that terminates in a shoulder 50. Also, a rounded projection 54 is preferably struck out from the outer side of each of the toothed portions 46.

One end of the cage blank, herein illustrated as the left end, terminates in a cross bar 28a which is approximately half the width of a cross bar 28. Similarly, the other end of the cage blank herein illustrated in spaced relation to the left end of the blank, terminates in a cross bar 28b of approximately half of the width of a cross bar 28. A tongue portion 34b extends from the cross bar 28b in the same manner as described with respect to the tongue portions 34, and has a blind end recess 39b corresponding to the recesses 39. The adjacent portions of the end cross bars 28a and 28b may be suitably secured together when the cage is wrapped up into annular form, as by the illustrated interlocking dove-tailed portions or in other suitable manner. Also, it is preferred to permanently and rigidly secure these abutting cage ends together as by spot welding.

The dotted lines shown in FIGURE 2 are to illustrate the positions at which the cage blank is bent to produce the final desired single piece, ring-shaped cage with the required protruding tongues and lugs. The adjacent arms 26 and 27 on each side wall 22, 22a are first bent through 90° at the ends of the cross bars as indicated at the dotted lines 56 to provide a generally channel-shaped elongated blank having spaced parallel side walls interconnected by the flat cross bars 28. The lugs 30 are bent inwardly at the dot-indicated positions at the base of each of these lugs to project laterally inwardly toward each other from the side walls 22 and 22a and in spaced relation as best illustrated in FIGURE 3. The tongues 34 and 34b are respectively bent at the dot-indicated positions at the base of each tongue and adjacent the edge of each slot 39 or 39b to project downwardly and inwardly between the cage side walls as indicated in FIGURES 1 and 3. Each lug 42 is bent respectively about its dot-indicated position at the base of each lug in FIGURE 2 to extend slightly angularly outwardly with respect to each cross bar as best illustrated in FIGURE 1. Each cross bar is angularly bent at its intermediate dot-indicated position between the vertices of the opposite recesses 24 to provide oblique sloping side walls as 28c between each window 16 and to thereby form the cage blank to a substantially annular contour. This bending to an annular form may be accomplished about a mandrel as shown in FIGURE 3. Each V-shaped recess 24 permits sufficient clearance between the inwardly extending arms 26 and 27 so that this recess now has opposed side walls in general radial relation to the cage as best shown in FIGURE 1.

The accordion-shaped springs 20 have rearwardly and angularly protruding ends 60 and forwardly protruding arcuate end portions 62 which fit respectively against and generally conform with a portion of the periphery of an adjacent roller 18. A rearward fold of each spring 20 is demountably seated in embracing relation over the inwardly projecting tongue 34 and the end portions 60 are entered through the slots 39 and 39b to yieldably wedge in locking relation against the underside of cross bar as illustrated in FIGURE 1. Each roller 18 is entered into the window 16, and before assembly with the race rings is held in unit-handling relation with the cage between the arcuate spring end 62 and the lug 42 and the inwardly protruding opposing lugs 30 at the forward end of each window as shown at the right hand end of FIGURE 1. Hence with these rollers snapped into position, the cage, rollers and springs remain in unit-handling demountable assembly. The rollers have parallel flat ends in closely spaced but freely movable relation between the parallel spaced side walls of the cage.

One of the race rings, as the inner race ring 12, is provided with a circular raceway 70 herein illustrated as cylindrical and coaxial with the bore of the inner race ring which may be suitably mounted on a shaft. The other race ring, as the outer race ring 10, is provided with a series of corresponding circumferentially spaced arcuate cam portions 72 which terminate in substantially radial shoulders 74 and form therewith a series of circumferentially spaced narrowing throats in which the rollers 18 may be wedged in and released from a uni-directional driving engagement. The end of each cam portion 72, opposite to that of its terminating shoulder 74, preferably blends with a parti-cylindrical race ring surface 76 coaxial with the inner race ring and circumferentially extending counter-clockwise to the next shoulder 74. As illustrated, each of the arcuate cam surfaces 72 is positioned out of radial alignment with any radius of the race rings and slopingly decreases its spacing with respect to the inner raceway 70 towards the counterclockwise end of each cam surface 72 where the radial spacing between the race rings is less than that of a roller diameter. The radial spacing between the race rings at the other end of each cam surface 72 and adjacent a shoulder 74, appreciably exceeds that of a roller diameter 18. Consequently, a relative race ring movement tending to wedge each roller 18 within the narrow portion of its throat as viewed in FIGURE 1, provides a positive one-way driving engagement between the race rings through the rollers, and an opposite relative race ring movement disengages these rollers into the enlarged ends of the cam throats wherein the roller drive is disengaged and one race ring may freely overrun the other ring so that no driving relation is transmitted between the rings. The springs 20 individually urge each of the rollers 18 counterclockwise of the cage and within each cage window 16 towards a wedged driving relation. This driving engagement occurs with the rollers spaced from the lugs 42 and 30 as shown at the left hand of FIGURE 1. There is no lost motion or backlash in this clutch since each roller is at all times in a driving position whenever the proper relative race ring rotation exists.

In most prior clutches, the cage is immovable with respect to one of the race rings. Consequently, each cage window in these prior cages has to be of sufficient length to provide for roller movement into and out of operative driving position thus materially limiting the number of rollers within the cage. My cage is arranged for a partial rotation with respect to both race rings. The inwardly projecting cage teeth 46 are free to circumferentially move with the rollers and through a portion of the circumferential length of each cam 72 thereby facilitating a larger number of rollers in the same size of cage with much improved load carrying capacity to the clutch since the rollers do not have to individually move through as great an extent within the length of each cage window. The forward movement (herein illustrated as a clockwise movement) of the cage 14 with respect to the race ring 10, is limited by the engagement of the cage shoulders 50 against the outer race ring shoulders 74 as illustrated in FIGURE 1. The rearward movement of the cage is limited by the extent of movement of the rollers into wedged driving relation. Hence, there is no interference between the projecting teeth 46 and the cam portions 72. The cage is piloted in coaxial relation with the race rings by engagement of the intermediate portion of each of the cross bars 28 in light slidable relation with the parti-cylindrical surfaces 76 of the outer race ring 10. The outwardly projecting knobs of dimples 54 may be in light engaging relation with locating rims not shown to axially position the cage assembly.

In operation, when there is no driving relation between the race rings 10 and 12, the springs 20, acting through the rollers 18, will locate the cage shoulders 50 against the outer race ring shoulders 74. During a relative race ring rotation, whenever the outer race ring 10 overruns the inner race ring 12 in a counterclockwise direction as viewed in FIGURE 1, or whenever the inner race ring 12 overruns the outer race ring in clockwise direction as viewed in FIGURE 1, the circumferentially spaced rollers 18 within the windows 16, will be released from their wedged driving engagement between the race rings and no driving relation will occur. However, at this time, the roller urged springs 20 individually maintain each of the rollers in engagement with its cam surface 72 and with the inner race ring in preparation for the next clutch driving operation. When the outer race ring tends to overrun the inner race ring in a clockwise direction as viewed in FIGURE 1, or whenever the inner race ring tends to overrun the outer race ring in a counterclockwise direction as viewed in FIGURE 1, the rollers will immediately and individually wedge in positive driving engagement with the cam surfaces 72 and with the raceway 70 and provide a uni-directional drive between the race rings 10 and 12. In view of the fact that each of the springs 20 yieldably and initially locates its roller in drive-engaging position with the cam surfaces and with the inner race ring, there can be no backlash or lost motion at the start of a clutch engaging operation. Also, each roller will immediately take its full share of the load to uniformly distribute the load throughout the rollers and greatly increase the clutch life over that of prior constructions wherein the load is frequently carried by only a few of the rollers.

It is not intended that this invention should be limited to the structure precisely illustrated since various equivalent arrangements lie within the scope of this invention. For example, it has been found that usually it is only necessary to employ inwardly projecting teeth 46 for engagement with a few or with alternating shoulders 74 of the outer race ring. However, it is within the scope of this invention to employ inwardly projecting teeth 46 at each window for respective engagement with the shoulders 74. Also, the abutting cage ends may be permanently secured together in any suitable manner as by welding, brazing and/or by other suitable interlocking means. In some instances, the cage has sufficient inherent rigidity so that it is unnecessary to fasten the abutting ends together. Furthermore, other shapes of generally equivalent inwardly protruding lugs corresponding to the lugs 30 and 42, may be used in cooperation with the curved ends of springs 20 to hold the rollers in unit-handling cage relation.

I claim:

1. A one-way clutch comprising a pair of relatively rotatable spaced annular members one of which has an annular raceway in opposed spaced relation to said other member, said other member having a cam portion radially spaced from the raceway and decreasing in its spacing from the raceway in one circumferential direction of raceway rotation, a single piece cage between said members, said cage having laterally bent-over, generally parallel side walls interconnected with circumferentially spaced cross bars, a rolling element between adjacent cross bars and movable into and out of one-way wedged driving engagement between said cam portion and said raceway, a bent-over tongue portion projecting inwardly from one of the cross bars, said other cross bar having a projecting lug bent in angular relation to a cross bar, a spring member supported by the tongue portion and having an end portion engaging the rolling element, said spring and lug cooperatively holding the rolling element and cage in unit-handling relation when the cage and roller is disassembled from said annular members, and means limiting the cage to a partial rotation with respect to said cam portion.

2. A one-way clutch comprising a pair of relatively rotatable spaced annular members one of which has an annular raceway, said other member having a cam portion radially spaced from the raceway and decreasing in its spacing from the raceway in one circumferential direction of raceway rotation, a single piece stamped out sheet metal rotatable cage located between said members, said cage having laterally bent-over parallel side walls interconnected with a plurality of circumferentially spaced cross bars, a roller between an adjacent pair of spaced cross bars and movable in and with the cage into and out of one-way wedged driving engagement between said raceway and said cam portion, a projecting lug extending from one of the cross bars and bent in angular relation to the plane of the cross bar, a bent-over lug laterally projecting inwardly from one of the side walls towards said other side wall, a tongue portion on an adjacent cross bar and projecting generally radially inwardly of the annular members in spaced relation to and between the cage side walls, a spring member demountably fitted over said tongue portion and yieldably engaging the roller, said spring cooperating with said lugs to hold the roller in demountable unit-handling relation with the cage when the cage is disassembled from between said annular members, and interengageable portions on the cage and on one of said members limiting the cage to a partial rotation with respect to said cam portion.

3. A one-way clutch comprising a pair of relatively rotatable spaced annular members one of which has an annular raceway, said other member having circumferentially spaced cam portions spaced from the raceway and decreasing in their radial spacing from the raceway in one circumferential direction of raceway rotation, a single piece sheet metal rotatable cage between said members, said cage having laterally bent-over parallel side walls interconnected with a plurality of circumferentially spaced cross bars, the adjacent spaced cross bars and side walls cooperatively providing a series of circumferentially spaced windows, a roller received in each window for movement therein circumferentially of the cage into and out of one-way wedge driving engagement between said cam portions and said raceway, each cross bar having a pair of divergent faces, the intermediate portions of these faces being slidably piloted on portions of said other annular member between adjacent cam portions, cooperating means in the side walls of the cage and upon one of said members permitting a restricted rotational movement of the cage with respect to said cam portions, a bent-over tongue on each of the cross bars extending generally radially into one end of a cage window in spaced relation between the cage side walls, an outwardly bent lug projecting from an intermediate portion of the cross bar at the other end of said window, a pair of bent-over lugs on the side walls and extending towards each other at said other end of each window, and a spring demountably fitted over the tongue at one end and interfittingly engaged with the roller at the other end, said spring cooperating with said lugs to secure the roller in unit-handling relation with the cage prior to location of the cage between said annular members.

4. A one-way clutch comprising a pair of relatively rotatable spaced annular members one of which has an annular raceway, said other member having cam portions spaced from the raceway and decreasing in their spacings therefrom in one direction of raceway rotation, a single piece cage between the members and bent to shape, said cage having laterally bent-over parallel side walls interconnected with circumferentially spaced cross bars, the side walls and cross bars providing circumferentially spaced windows, a roller in each window, springs urging the rollers into driving engagement between the cam portions and the raceway, the side walls being interrupted by cut-away portions adjacent each cross bar, each cross bar being angularly and transversely bent between said cut-away portions, and the intermediate cross bar portions being slidably engageable with one of said members between said cam portions to radially position the cage between said annular members.

5. A one-way clutch comprising a pair of relatively rotatable spaced annular members one of which has an annular raceway, said other member having circumferentially spaced cam portions spaced from the raceway and decreasing in their spacings therefrom in one direction of raceway rotation, a single piece sheet metal cage between the members and bent to shape, laterally bent-over cage side walls extending from circumferentially spaced cross bars, the side walls and cross bars providing circumferentially spaced windows, a roller in each window, springs carried by the cross bars and yieldably urging the rollers individually into driving engagement with the raceway and with said cam portions, the side walls being interrupted by cutaway portions extending radially to an end of each cross bar, each cross bar being angularly and transversely bent along an intermediate portion thereof extending between the side walls, said intermediate cross bar portion being slidably piloted between the cam portions of one annular member, and cage means cooperating with the springs to secure the rollers in unit-handling assembly with the cage.

6. A one-way clutch comprising a pair of relatively rotatable spaced annular members one of which has an annular raceway, said other member having circumferentially spaced cam portions radially spaced from the raceway and decreasing in their spacings therefrom in one direction of raceway rotation, a single piece rotatable sheet metal cage between the members and bent to shape, laterally bent-over cage side walls extending from circumferentially spaced cross bars, said side walls and cross bars providing circumferentially spaced windows, a roller in each window between the annular members, springs respectively carried by the cross bars and yieldably urging the rollers individually into driving engagement with the raceway and with said cam portions, the side walls being interrupted by cut-away portions extending to an end of each cross bar, each cross bar being transversely bent intermediate its width to form a pair of oblique wall portions, the intermediate portions of the cross bars being slidably piloted on one of the annular members between said cam portions, and cooperating means on the cage and on one of said annular members limiting the cage movement to a partial rotation with respect to said cam portions.

7. A one-way clutch comprising a pair of relatively rotatable spaced annular members one of which has an annular raceway, said other member having circumferentially spaced cam portions radially spaced from the raceway and decreasing in their spacings therefrom in one direction of raceway rotation, a single piece sheet metal cage rotatable between said members, laterally bent-over cage side walls extending from circumferentially spaced cross bars, said side walls and cross bars providing transversely spaced windows through the cage, a roller in each window between said annular members, springs respectively carried by the cross bars and yieldably urging the rollers individually into engagement with the raceway and with said cam portions, each of the side walls being interrupted by spaced cut-away portions respectively extending to an intermediate portion of the end of each cross bar, each cross bar being transversely bent intermediate its width and between the ends of said cut-away portions to provide oblique sloping walls upon each cross bar, the intermediate portions of said cross bars being slidably piloted upon one of said annular members, each of said cam portions terminating in a shoulder, and radially projecting teeth extending from and integral with said side walls for engagement with said shoulders to restrict the cage to a partial rotation with respect to the annular member having the cam portions.

8. A one-way clutch comprising a pair of relatively rotatable spaced annular members one of which has an annular raceway, said other member having circumferentially spaced cam portions radially spaced from the raceway and decreasing in their spacings therefrom in one direction of raceway rotation, a single piece rotatable sheet metal annular cage between and rotatable with respect to both of said members, bent-over cage side walls radially extending from circumferentially spaced cross bars, said side walls and cross bars providing spaced windows through the cage, a roller in each window between the annular members, springs respectively carried by the cross bars and yieldably and individually urging the rollers into simultaneous driving engagement with the raceway and with said cam portions, each cross bar being transversely bent intermediate its width to provide a pair of oblique wall portions on the cross bar, the intermediate portions of the cross bars between said oblique wall portions being slidably piloted on one of the annular members, lugs projecting from the cage and cooperating with said springs to locate the rollers in unit-handling relation with the cage when the cage and rollers are disassembled from said annular members, and cooperating means on the cage and on one of said annular members limiting the cage to a partial rotation in one direction of rotation with respect to said cam portions.

9. A one-way clutch comprising a pair of relatively rotatable spaced annular members one of which has an annular raceway, said other member having circumferentially spaced cam portions spaced from the raceway and decreasing their radial spacing therefrom in one direction of raceway rotation, said other member having circumferentially spaced coaxial parti-circular portions respectively located between said cam portions, a sheet metal annular cage journalled on said parti-circular portions for partial rotation with respect to said other member, circumferentially spaced cross bars on the cage, bent-over cage side walls respectively extending from said cross bars, said side walls and cross bars providing spaced windows through the cage, a roller in each window between the annular members, springs respectively carried by the cross bars and yieldably and individually urging the rollers into simultaneous driving engagement with the raceway and with said cam portions, lugs projecting from the cage and cooperating with said springs to locate the rollers in unit-handling relation with the cage when the cage and rollers are disassembled from said annular members, and abutting portions on the cage and on one of the said annular members restricting the extent of relative rotation between the cage and the cam portions in one direction of rotation, said abutting portions and rollers limiting the cage to a partial rotation with respect to said other member which does not exceed the circumferential length of one of said cam portions.

10. A one-way clutch comprising a pair of relatively rotatable spaced annular members one of which has an annular raceway, said other member having circumferentially spaced cam portions spaced from and decreasing in their radial spacings therefrom in one direction of raceway rotation, said other member having parti-cylindrical surfaces respectively located between the cam portions, a single-piece sheet metal cage rotatable between said members, circumferentially spaced cross bars on the cage, bent-over cage side walls radially extending from the cross bars, said side walls and cross bars providing spaced windows through the cage, a roller in each window engaging a cam portion and said raceway, said windows being of a length circumferentially of the cage less than that of a corresponding roller-engaging cam portion, springs respectively carried by the cross bars and yieldably and individually urging the rollers into simultaneous driving engagement with the raceway and with said cam portions, each cross bar being transversely bent intermediate its width to provide a pair of oblique wall portions on the cross bar, the intermediate portions of the cross bars between said oblique wall portions being slidably piloted on the parti-cylindrical surfaces between said cam portions, lugs projecting from the cage and cooperating with said springs to locate the rollers in unit-handling relation with the cage when the cage and rollers are disassembled from said annular members, and shoulder portions on the cage engageable with shoulder portions on said other member which are engageable with each other to limit the extent of cage rotation in one direction with respect to said cam portions, said abutting shoulder portions and said rollers cooperating to limit the cage to a partial rotation with respect to said cam portions through an extent which does not exceed the length of any of said cam portions.

References Cited in the file of this patent

UNITED STATES PATENTS

| | | |
|---|---|---|
| 1,955,475 | Sorensen | Apr. 17, 1934 |
| 2,061,999 | Foss | Nov. 24, 1936 |
| 2,371,653 | Schuckers | Mar. 20, 1945 |
| 2,591,160 | Kilian | Apr. 1, 1952 |
| 2,705,552 | Cross et al. | Apr. 5, 1955 |
| 2,753,027 | Troendly et al. | July 3, 1956 |
| 2,843,238 | Rozner | July 15, 1959 |
| 2,913,811 | Benson | Nov. 24, 1959 |
| 2,933,803 | Schaeffler | Apr. 26, 1960 |
| 2,973,847 | Stockton | Mar. 7, 1961 |